United States Patent Office 2,917,560
Patented Dec. 15, 1959

2,917,560

SYNTHESIS OF 1,1-DIARYLETHANE

Edwin Marvin Smolin and Donald Gifford Jordan, Stamford, Conn., assignors to American Cyanamid Company, New York, N.Y., a corporation of Maine No Drawing. Application August 13, 1956
Serial No. 603,807

6 Claims. (Cl. 260—668)

This invention relates to the process of producing unsymmetrical diarylethanes. More particularly, the invention relates to the production of 1,1-diarylethanes by the condensation reaction of acetylene with mono- or di-alkyl benzenes.

Heretofore, the synthesis of 1,1-diarylethanes from the sulfuric acid-mercuric salt catalyzed reactions of acetylene and alkyl-substituted benzenes have been conducted at atmospheric pressures and have been limited to the use of high-purity acetylene in the condensation reaction. We have now discovered that it is possible to conduct the condensation reaction at pressure above atmospheric and that dilute acetylene as manufactured or acetylene diluted with inert gases may be used as well as pure acetylene. The results achieved by reacting under pressure have been equally as good as those obtained at atmospheric pressure. In using dilute acetylene, pressure is an advantage since smaller apparatus may be employed at savings of considerable cost and space, which is very significant on the large installation involved.

It is the object of the present invention to provide a diarylethane synthesis process operative under a pressure greater than atmospheric, thereby permitting use of more dilute material and less expensive equipment without suffering a loss in yields or an increase in by-product formation. A further object of our invention is the production of diarylethanes wherein the yields obtained are greater than 75% of the theoretical, based on the amount of acetylene and substituted benzenes reacted.

In carrying out the process of our invention, the desired amount of substituted benzene is placed in a suitable reaction vessel and cooled to about 5° C. below the desired reaction temperature, stirring of the substituted benzene begun, and the sulfuric acid and mercury salt catalyst added. During the reaction, temperatures are maintained in the range of from about −20° C. to about 70° C. and pressures are held at from 1.5 to 10 atmospheres. Conventional equipment may be adapted to employ pressures of this magnitude. Stirring of the mixture is maintained throughout the reaction to contact intimately the acid and the hydrocarbons and to prevent catalyst deposition at the bottom of the reactor. The measured amount, either dilute or pure, of acetylene is introduced into the reactor over the period necessary and at the desired pressure to provide the calculated amount of acetylene. The amount of this gas stream will, of course, depend on the concentration of acetylene therein. After the acetylene addition is complete, the stirring of the reaction mixture is discontinued, the reaction mixture is separated and the 1,1-diarylethane recovered therefrom.

When the reaction is carried out at below 0° C., the reaction mixture is more difficult to work up and the separation of the acid layer from the desired product is slower. Therefore, it is preferred that a temperature range of from about 0° C. to about 45° C. be employed in the process.

Although the precise mechanism of using increased pressure and/or dilute gas in the reaction cannot be stated with certainty, by considering the nature of the reaction several important process advantages are possible. These advantages are believed explainable, in part at least, as follows:

For a given gas concentration, a higher pressure will cause a higher rate of gas solution and more rapid reaction. This is advantageous, since a smaller less expensive reactor may be used. Also, the shorter contact time will reduce the attack of the sulfuric acid on the organic compounds and result in a higher yield.

When dissolving gases in liquids where there is a rapid irreversible chemical reaction occurring, the effect of pressure would increase the rate of absorption, besides reducing the size of the equipment. In using a dilute gas, e.g. diluted to an extent of greater than about 10%, as compared to relatively pure acetylene, the pressure, although not necessarily affecting the rate of absorption, will reduce the size of the equipment. The rate of the reaction of toluene with acetylene, a reaction which is typical of diarylethane condensations, is dependent on the concentration of acetylene in the liquid phase. Thus according to Henry's law, $p_{gas} = KN_{gas}$; where $p_{gas}$ is the partial pressure of a gas above a solution, $N_{gas}$ is the mole fraction of the gas in solution and K is the "Henry's law constant" for the particular solution system; increasing the partial pressure of a gas above a solvent liquid increases its solubility. Because the reaction rate depends on the concentration of the dissolved gas, acetylene in this case, the increased pressure increases the overall rate of reaction of toluene with acetylene, resulting in a shorter, more economical procedure for the manufacture of ditolylethane and other diarylethanes.

The solubility of acetylene in toluene is approximately 680 ml. of acetylene gas at standard temperature and pressure per 100 ml. of toluene; this amount is sufficient to convert 5% of the toluene in which the acetylene is dissolved, to 1,1-ditolylethane. By increasing the pressure of acetylene above the toluene charged to the reactor for example, from 1 atmosphere to 7 atmospheres, there is then in solution an approximate sufficiency of acetylene to convert about 35% of the toluene to 1,1-ditolylethane, thereby making it unnecessary to feed further acetylene to the reaction mixture during the course of the reaction. This permits conversion of the aromatic hydrocarbon to be significantly controlled by regulation of the pressure in the system.

In order that those skilled in the art may more fully understand the inventive concept herein presented, the following examples are given by way of illustration and not limitation, unless otherwise noted in the appended claims. All parts are parts by weight.

As previously stated, our invention consists of using pressure greater than one atmosphere and up to about ten atmospheres for the liquid phase synthesis of unsymmetrical diarylethanes. Example 1 is a tabulation of the results obtained from a factorial experiment in 1,1-ditolylethane synthesis in which pressure was varied from 9.5 p.s.i.g. to 12 p.s.i.g.

EXAMPLE 1

A continuous stirred tank type reactor was used. Flow rates of acetylene, toluene, and sulfuric acid containing mercuric sulfate were steady and continuous. The runs lasted 3½ hours and all reactor product was collected (this amounted to 350 pounds) neutralized with caustic and a sample analyzed by distillation. Temperatures, pressures, and flow rates were maintained within close limits by automatic instruments.

The percent conversion of toluene under the varying pressure was substantially unchanged, i.e. 30.2% for the lower pressure as compared to 30.0% at the higher pressure.

EXAMPLE 2

Approximated conversions for other pressures varying from atmospheric pressure, i.e. zero p.s.i.g. to greater than 6.5 atmospheres, i.e. 96 p.s.i.g. are shown in Table 1.

Table 1

| Pressure, p.s.i.g.: | Percent conversion of toluene |
| --- | --- |
| 0 | 29.2 |
| 9.5 | 30.2 |
| 12 | 30.0 |
| 14.7 | 30.1 |
| 44.1 | 30.3 |
| 96 | 30.3 |

When employing pressures greater than atmospheric and up to about ten atmospheres, i.e. pressures at which conventional equipment may be employed and even when using considerably dilute or impure acetylene, yields obtained are comparable to those obtained when using substantially pure acetylene.

The process of the invention may be carried out in either a batch or multi-stage continuous operation. It is preferred that the reaction be carried out in a four-stage reactor in the manner set forth in U.S. Patent 2,734,928. We have found that the average concentration of 1,1-diarylethane present in the reaction product will determine the percent yield of the diarylethane reaction. It is apparent that a theoretical conversion of substituted benzene to 100% diarylethane could be realized. However, if the concentration of the aryl constituent increases, undesirable side reactions occur which decrease the ultimate yield recovered. Accordingly, by controlling the average concentration of the diarylethane with respect to acetylene and diluent in the reaction mixture obtained, increased yields may be obtained.

Thus, avoidance of deleterious side reactions, and accordingly preferred results with yields in excess of 75% are obtained when the concentration of 1,1-diarylethane produced is controlled. This is effected by the introduction of reactants at a rate so that from about 15% to about 45% of the stoichiometric amount of acetylene theoretically required to react with all of the substituted benzene is charged into the reactor. When the reactants fall outside this range, the yield is substantially diminished.

The diarylethane produced in accordance with the process of our invention may be catalytically reacted in the vapor phase to yield nuclear-substituted styrenes, i.e. methylstyrene from 1,1-ditolylethane, which are useful for various applications, such as molding articles, surface coatings, textile and paper treatment, and the like.

We claim:

1. In the process of synthesizing 1,1-diarylethanes wherein acetylene is reacted in the presence of a compound selected from the group consisting of toluene and xylene in the presence of a sulfuric acid-mercury salt catalyst, wherein from about 15% to about 45% of the stoichiometric amount of acetylene required to react with all of said substituted benzene, the improvement comprising effecting said synthesis under pressures of from 1.5 to 10 atmospheres and at temperatures of from about −20° C. to about 70° C.

2. In the process of synthesizing 1,1-ditolylethane wherein acetylene is reacted in the presence of toluene in the presence of a sulfuric acid-mercury salt catalyst wherein from 15% to about 45% of the stoichiometric amount of acetylene required to react with all of said toluene, the improvement comprising effecting said synthesis under pressures of from 1.5 to 10 atmospheres and at temperatures of from about −20° C. to about 70° C.

3. In the process of synthesizing 1,1-dixylylethane wherein acetylene is reacted in the presence of xylene in the presence of a sulfuric acid-mercury salt catalyst wherein from about 15% to about 45% of the stoichiometric amount of acetylene required to react with all of said xylene, the improvement comprising effecting said synthesis under pressures of from 1.5 to 10 atmospheres and at temperatures of from about −20° C to about 70° C.

4. In the process of synthesizing 1,1-diarylethanes wherein acetylene is reacted in the presence of a compound selected from the group consisting of toluene and xylene in the presence of a sulfuric acid-mercury salt catalyst, wherein from about 15% to about 45% of the stoichiometric amount of acetylene required to react with all of said substituted benzene, the improvement comprising employing dilute acetylene gas having an acetylene content of from about 5% to about 99%, effecting said synthesis under pressures of from 1.5 to 10 atmospheres and at temperatures of from about −20° C. to about 70° C.

5. In the process of synthesizing 1,1-ditolylethane wherein acetylene is reacted in the presence of toluene in the presence of a sulfuric acid-mercury salt catalyst wherein from about 15% to about 45% of the stoichiometric amount of acetylene required to react with all of said toluene, the improvement comprising employing dilute acetylene gas having an acetylene content of from about 5% to about 99%, effecting said synthesis under pressures of from 1.5 to 10 atmospheres and at temperatures of from about −20° C. to about 70° C.

6. In the process of synthesizing 1,1-dixylylethane wherein acetylene is reacted in the presence of xylene in the presence of a sulfuric acid-mercury salt catalyst wherein from about 15% to about 45% of the stoichiometric amount of acetylene required to react with all of said xylene, the improvement comprising employing dilute acetylene gas having an acetylene content of from about 5% to about 99%, effecting said synthesis under pressures of from 1.5 to 10 atmospheres and at temperatures of from about −20° C. to about 70° C.

References Cited in the file of this patent

UNITED STATES PATENTS

| 2,734,928 | Smolin | Feb. 24, 1956 |
| --- | --- | --- |
| 2,773,914 | Prill | Dec. 11, 1956 |
| 2,802,038 | Prill | Aug. 6, 1957 |